Oct. 15, 1968

F. M. WANLASS 3,406,346

SHIFT REGISTER SYSTEM

Filed April 20, 1966

INVENTOR
FRANK M. WANLASS
BY [signature]
ATTORNEY 3,406,346
Patented Oct. 15, 1968

3,406,346
SHIFT REGISTER SYSTEM

Frank M. Wanlass, Huntington, N.Y., assignor to General Instrument Corporation, Newark, N.J., a corporation of Delaware Filed Apr. 20, 1966, Ser. No. 543,860
13 Claims. (Cl. 328—37)

ABSTRACT OF THE DISCLOSURE

A two-stage shift register circuit in which the output from the second stage is controllably fed back to the input of the first stage so as to ensure that the stages remain in a given condition until such time as a different input signal is switched to the first stage to modify its condition.

Figures 1, 2:
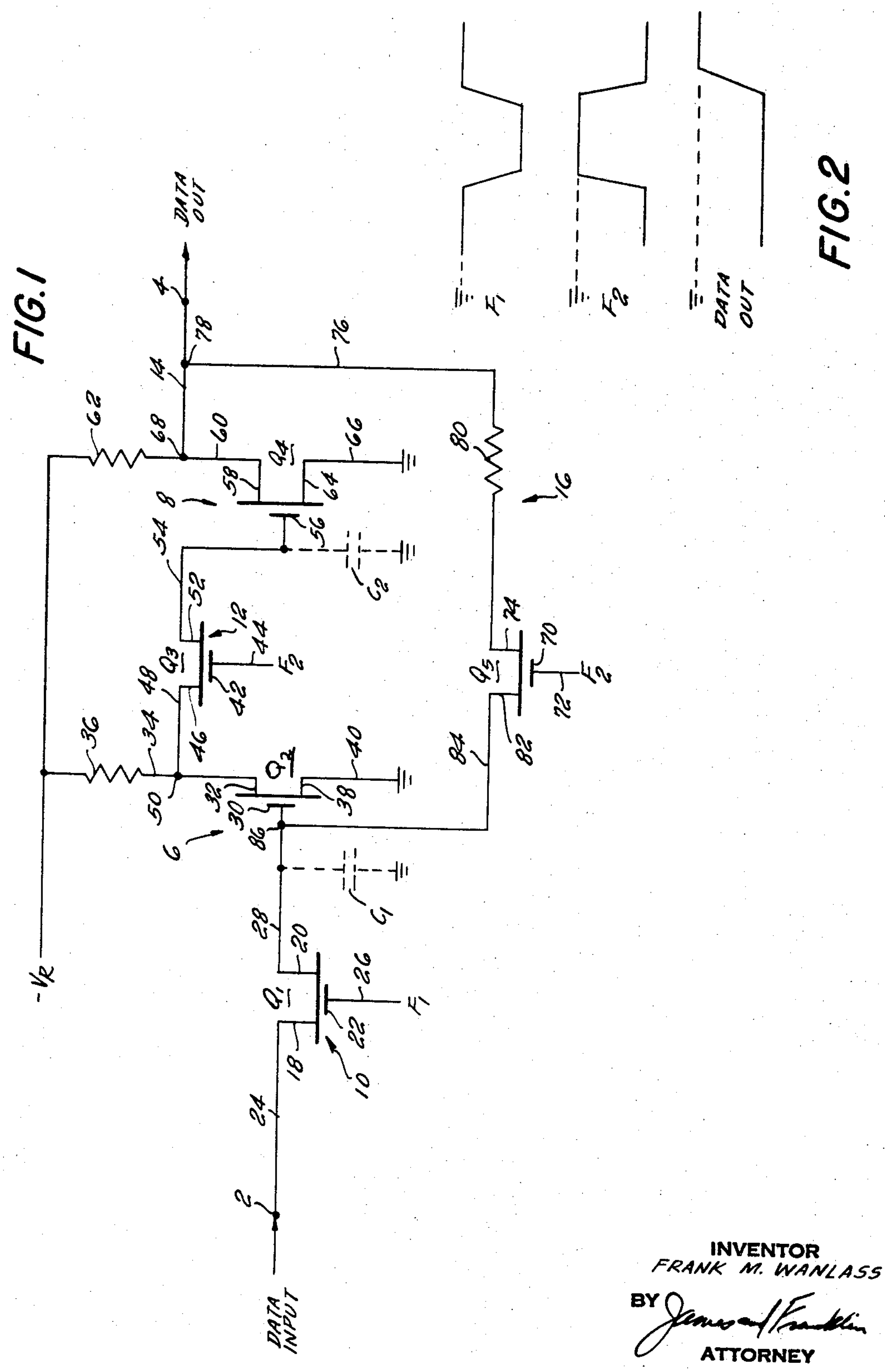

The present invention relates to shift register circuitry and in particular to such circuitry which is capable of use at shift frequencies ranging from zero to very high frequencies on the order of many hundreds of kilocycles per second.

Shift register systems are well known logic components. They have many uses, among which memory and time delay are important. They may be characterized as systems which receive a data signal and, controlled by a shifting or clock signal, transfer that data signal to another system of the same or different character. A plurality of such systems may be connected together, the data signal finally emerging from the last system after it has been shifted serially from system to system through the entire array.

One problem involved in such shift register systems is that of data signal retention. Usually each shift register system will retain a given data signal for only a limited period of time, thus placing a definite lower limit on the shift frequency which can be used; if shifting of the data signal from one system to another is not carried out rapidly enough the data signal will become lost.

It is a prime object of the present invention to devise a shift register system which will retain a data input signal virtually indefinitely, so that as a practical matter there is no lower limit to the shift frequency which may be employed. At the same time, the system is so designed that shift frequencies at least as high as 500 kilocycles per second can still be employed.

Another prime object of the present invention is to devise a shift register system which is readily incorporated into integrated circuitry. An integrated circuit is one which can be completely or virtually completely built into a very small physical element, such as a chip of semiconductor material. This small semiconductor chip will include all of the operative circuit components as well as the necessary connections therebetween, such components including passive components such as resistors and capacitors as well as active components such as transistors or similar devices.

In accordance with the above, each shift register system of the present invention is composed of a pair of transfer stages serially connected between a system input port and a system output port. The data input signal is transferred from system input port to system output port in two steps, first being transferred from the system input port to the first transfer stage and then from the first transfer stage to the second transfer stage, the system output port being connected to the second transfer stage. This sequential shifting of the data signal is accomplished by a shift control signal composed of two alternatively operative parts, the first part effecting the first shift (to the first transfer stage) and the second part effecting the second shift (to the second transfer stage). Once the shift cycle has been completed, a feedback or latching means becomes effective to retain the transfer stages in their existing condition until the next shift cycle occurs. Thus the user of the system can terminate the shift control signal at any time, the system storing information indefinitely between shift cycles.

The shifting preferably is accomplished and controlled by electronic switch means of the transistor type, those switch means having output circuit terminals and a control terminal. It has been found particularly effective to use field effect transistors for this purpose. The output terminals of such devices are generally termed the source and drain respectively, and the control terminal of the device is generally termed the gate. A field effect device has the characteristic that a closed circuit is established between its output terminals when a suitable negative potential is applied to its gate or control electrode, an open circuit being established between its output terminals when its control terminal or gate is at ground potential. Thus these devices function as switches of exceptionally high speed, the switch being closed when a negative potential is applied to the gate and the switch being open when the gate is at ground potential. One such switch is provided between the system input port and the first transfer stage, and a second such switch is provided between the first and second transfer stages. During a shift cycle negative voltages comprising the two parts of the shift control signal are alternatively and sequentially applied to the gates of the field effect devices which constitute these two switches so as to first close the first switch while keeping the second switch open and then to close the second switch after the first switch has opened. When the first switch is closed the data signal is transferred from the system input port to the first stage, where it remains until the first switch opens and the second switch closes. When the latter occurs the data signal is transferred to the second stage while the first stage is disconnected from the system input port. After the first stage has been thus disconnected from the system input port, the output of the second stage, the nature of which is determined by the character of the data signal shifted thereto, is fed back to the first stage, thus latching both stages in appropriate condition depending upon the nature of the operative data signal. That portion of the shift control signal which closes the switch between the first and second stages also controls the feedback circuit, preferably by controlling an additional field effect transistor functioning as a switch.

The transfer stages themselves may be constituted by field effect devices functioning as switches, those devices being conditioned to be conductive or non-conductive depending upon the nature of the data signal applied to their gates or control terminals.

As here specifically disclosed, only a single shift register system will be described, it being understood that as many such systems as desired may be serially connected to satisfy external requirements.

As has been mentioned, each shift cycle involves the alternative and sequential application of two parts of an overall shift signal. However, as a practical matter, only a single signal part need be supplied to the system; the correlative or alternately acting shift signal part can be produced from the supplied shift signal part by simple inverter circuitry.

The shift signal can be regularly supplied from a clock generator of conventional design or it may be supplied aperiodically through logic networks.

To the accomplishment of the above, and to such other objects as may hereinafter appear, the present invention relates to a shift register system as defined in the appended claims and as described in this specification, taken together with the accompanying drawings, in which:

FIG. 1 is a circuit diagram of a single shift register system section in accordance with the present invention; and FIG. 2 is a graphical representation of the time relationship between the shift signals and the data output signal of the illustrated system section.

As has been indicated, FIG. 1 illustrates a single system or "bit," it being understood that as many such systems or "bits" as desired may be connected, serially or otherwise, in order to produce the desired degree of delay, the desired number of memory stages, or to satisfy any other external requirement. Each system or "bit" comprises a system input port 2, a system output port 4, and a pair of serially connected transfer stages generally designated 6 and 8 respectively. An electronic switch generally designated 10 connects the system input port 2 to the first transfer stage 6. An electronic switch generally designated 12 connects the first transfer stage 6 to the second transfer stage 8. A lead 14 connects the output port 4 to the second transfer stage 8. A feedback or latching circuit generally designated 16 connects the output of the second transfer stage 8 to the input of the first transfer stage 6.

The electronic switch 10 is defined, as here specifically disclosed, by a field effect transistor $Q_1$ having source terminal 18, drain terminal 20 and gate terminal 22. The source terminal 18 is connected by lead 24 to the data input port 2. The gate terminal 22 is connected by lead 26 to a shift control signal source $F_1$. The drain electrode 20 is connected by lead 28 to the gate electrode 30 of the field effect transistor $Q_2$ which forms a part of the first transfer stage 6. The drain electrode 32 of the field effect transistor $Q_2$ is connected by lead 34 and resistor 36 to a negative reference voltage source $-V_R$. The source electrode 38 of the field effect transistor $Q_2$ is connected by lead 40 to ground.

The switch 12 between the first and second transfer stages 6 and 8 respectively is defined by field effect transistor $Q_3$ the gate electrode 42 of which is connected by lead 44 to a second shift control signal source $F_2$. The source electrode 46 of the field effect transistor $Q_3$ is connected by lead 48 to point 50 on the lead 34. The drain electrode 52 of the field effect transistor $Q_3$ is connected by lead 54 to the gate electrode 56 of field effect transistor $Q_4$ which forms a part of the second transfer stage 8. The drain electrode 58 of the field effect transistor $Q_4$ is connected by lead 60 and resistor 62 to the negative reference voltage source $-V_R$. The source electrode 64 of the field effect transistor $Q_4$ is connected by lead 66 to ground. The lead 14 connected to the system output port 4 is connected to point 68 on the lead 60.

The latching or feedback means 16 comprises another field effect transistor $Q_5$ the gate electrode 70 of which is connected by lead 72 to the control voltage source $F_2$. Its source electrode 74 is connected by lead 76 to point 78 on the lead 14, and a resistor 80 is preferably interposed in the lead 76. The resistor 80 is inherent in the field effect transistor $Q_5$, but a separate resistance component could be used if desired. The drain electrode 82 of the field effect transistor $Q_5$ is connected by lead 84 to point 86 on the lead 28.

Inherent in the structure of field effect transistors is a certain amount of interelectrode capacitance. The gate-source capacitance of transistor $Q_2$ is represented in the circuit diagram by the broken line capacitor $C_1$, and the gate-source capacitance of field effect transistor $Q_4$ is represented by the broken line capacitor $C_2$. The capacitors $C_1$ and $C_2$ are shown in broken lines merely to indicate that they represent inherent capacitance and not separate and discrete circuit components. It will be understood, however, that actual capacitors could be employed if desired.

The relationship between the two shift control signal parts $F_1$ and $F_2$ is illustrated in FIG. 2. During the normal or stand-by condition of the system part $F_1$ is at ground potential and part $F_2$ is at a predetermined negative potential. When, in order to initiate a shift, the signal part $F_1$ becomes negative, signal part $F_2$ changes to ground potential. When control signal part $F_1$ resumes ground potential control signal part $F_2$ returns to its negative potential. Thus parts $F_1$ and $F_2$ are seen to be 180 degrees out of phase, with only one of those signals being negative at any time. When $F_1$ is negative $F_2$ is at ground, and when $F_2$ is negative $F_1$ is at ground. It is because of this relationship that only the signal part $F_1$ need be supplied externally of the system; the correlative signal part $F_2$ may be derived at the system from $F_1$ by any suitable inverter circuitry (not shown), the nature of which is well known to those skilled in the art.

The operation of the system will now be described. The key to understanding its operation is a realization that each of the electronic switches defined by the field effect transistors $Q_{1-5}$ will be closed or conductive when an appropriate negative potential is applied to its control or gate electrode and will be open or non-conductive when ground potential is applied to that electrode.

In the stand-by condition of the system $F_1$ is at ground and $F_2$ is at a suitable negative potential. Thus the switch defined by $Q_1$ is open and the switches defined by $Q_3$ and $Q_5$ are closed. Since $Q_1$ is open the gate electrode 30 of $Q_2$ is disconnected from the data input port 2. Since $Q_3$ is closed the transfer stages 6 and 8 are connected to one another. Since $Q_5$ is closed the feedback circuit $F_2$ is operative. The system output port 4 is always connected to point 68 in the second transfer stage 8.

Let us assume that a given data signal is present at system input port 2, that signal being either at ground potential or at a predetermined negative potential. The first step in shifting that data signal through the system illustrated in FIG. 1 is for the control voltage part $F_1$ to become negative and the control voltage part $F_2$ to become ground. As a result $Q_1$ closes and $Q_3$ and $Q_5$ open. ($Q_3$ and $Q_5$ should open before $Q_1$ closes.) When $Q_1$ closes the system input port 2 is connected to the gate electrode 30 of $Q_2$, while the opening of $Q_3$ and $Q_5$ disconnects stage 6 from stage 8 and renders the feedback circuit 16 inoperative. If the data signal is negative that signal, applied to the gate electrode 30 of $Q_2$, will make $Q_2$ conductive, thus clamping point 50 to ground potential. If the data signal at the input port 2 is at ground potential, that ground potential will be applied to the gate electrode 30 of $Q_2$, $Q_2$ will become non-conductive, and point 50 will be substantially at the negative voltage $-V_R$. If the gate electrode 30 of $Q_2$ is negatively biased, capacitor $C_1$ will charge accordingly; if the gate electrode 30 is ground-biased, condenser $C_1$ will discharge accordingly.

The next step in the shifting process is for control signal part $F_1$ to return to ground potential and for control signal part $F_2$ to return to negative potential. When $F_1$ returns to ground potential $Q_1$ is opened and gate electrode 30 is disconnected from the system input port 2. When $F_2$ becomes negative $Q_3$ closes, thus transferring to gate electrode 56 of field effect transistor $Q_4$ the potential of point 50. $C_1$ retains $Q_2$ in that condition (conductive or non-conductive) in which it has been placed by prior reception of the data signal. If the prior data signal was negative, $Q_2$ is conductive, point 50 is at ground potential, gate electrode 56 is at ground potential, $Q_4$ is non-conductive, and point 68, and hence system output port 4, is substantially at the negative reference voltage $-V_R$. On the other hand, if the prior data signal was at ground potential, $Q_2$ is non-conductive, point 50 is at the potential of $-V_R$, gate electrode 56 is at a negative potential, $Q_4$ is conductive, point 68 is clamped to ground potential, and the system output port 4 is correspondingly at ground potential. Thus it will be seen that the successive actions of $F_1$ and $F_2$ in becoming negative have transferred to the system output port 4 that data signal potential which was originally at data input port 2.

The capacitor $C_2$ will charge or discharge depending upon the bias applied to the gate electrode 56 of $Q_2$. If that gate electrode is biased negatively, the capacitor $C_2$ will charge accordingly. If the gate electrode 56 is at ground potential, the capacitor $C_2$ will discharge accordingly.

The potential of point 68 and the system output port 4 is fed back by the latching or feedback circuit 16 to the gate electrode 30 of the field effect transistor $Q_2$ via lead 76, resistor 80, field effect transistor $Q_5$ and lead 84. This feedback will occur when $Q_5$ is closed or conductive, and this in turn will occur when $F_2$ is negative, and hence after $F_1$ has become negative and then resumed its normal ground potential condition. When $Q_5$ is closed $Q_3$ is also closed. If the system output port 4 is at ground potential, which will be the case when $Q_4$ is conductive, that ground potential will be transferred (when $Q_5$ is closed) to the gate electrode 30 of $Q_2$, ensuring that $Q_2$ is non-conductive and thus ensuring that point 50 is negatively biased, thereby, through closed switch $Q_3$, negatively biasing gate electrode 56 of $Q_4$, thereby ensuring that $Q_4$ remains conductive and that system output port 4 remains at ground potential. Conversely, if the system output port 4 is at negative potential, that negative potential will be transferred (when $Q_5$ is closed) to the gate electrode 30 of $Q_2$, ensuring that $Q_2$ is conductive, thereby ensuring that point 50 is at ground potential, thereby (via closed switch $Q_3$) ensuring that gate electrode 56 of $Q_4$ is at ground potential, thereby ensuring that $Q_4$ is non-conductive and that system output port 4 remains at negative potential. Hence the feedback circuit 16 functions at a latch, ensuring that the system will indefinitely, for as long as $-V_R$ is supplied and $F_1$ and $F_2$ remain in their stand-by conditions at ground and negative potentials respectively, remain in what condition it may be after the two-stage shifting cycle has been completed.

The function of $C_1$ is to ensure that $Q_2$ will remain in its data-signal-produced condition during that time necessary for $F_1$ to shift from negative to ground and for $F_2$ to shift from ground to negative. Once the action of the feedback or latching circuit 16 has taken place, $C_1$ is no longer necessary. The function of $C_2$ is to cause the field effect transistor $Q_4$ to retain its condition during the entire time that $F_1$ is negative. In a practical instance the capacitance of $C_2$ is less than 1 picofarad, its leakage time constant being in the order of milliseconds. This places a limit on the length of time that $F_1$ can remain negative, a practical limit of 50 microseconds being recommended. However, because of the action of the latching circuit 16 there is no practical limit on the length of time that $F_1$ may remain at ground potential.

The function of the resistor 80 in series with the field effect transistor $Q_5$ is to control the time delay involved in the feedback or latching operation, it being desirable that the feed-back action not occur until after the output potential at system output port 4 has reached its appropriate value.

As indicated in FIG. 2, the data signal does not appear at the system output port 4 until a time corresponding to the trailing edge of the negative pulse of $F_1$. There is sufficient built-in delay in the system so that the signal at the system output port 4 will not start to change appreciably until $F_1$ has returned to ground potential. As a result it is possible to transfer data from the system output port 4 to other inputs, whether of similar or different shift register systems or even other types of logic components, without difficulty. Substantially the only precautions that need be taken with the system of the present invention are that both $F_1$ and $F_2$ are not operatively negative at the same time, and that there is no appreciable change in the data signal during the time that $F_1$ is negative.

Commercial embodiments of the instant invention function on a shift pulse frequency from direct current to 500 kilocycles per second with a shift pulse rise and fall time of less than 100 nanoseconds and with a shift pulse width between 400 nanoseconds and 50 microseconds. Power consumption is less than 150 milliwatts. The capability of the circuit design here disclosed of being incorporated into integrated circuitry is very advantageous.

The electrical connections to the electrodes other than the gate electrode of field effect transistors $Q_2$ and $Q_4$ rigidly define those electrodes as gate and drain respectively. However, the non-gate electrodes of the field effect transistors $Q_1$, $Q_3$ and $Q_5$ cannot be thus rigidly defined, since the electrical potentials applied thereto vary from condition to condition, and hence their respective designation as drain and source are, it will be understood, arbitrary designations.

While but a single embodiment of the present invention has been here specifically disclosed, it will be apparent that many variations may be made therein, all within the scope of the instant invention as defined in the following claims.

I claim:

1. A shift register system comprising first, second, third and fourth electronic switch means, a reference voltage source, a data signal source, first and second control voltage sources which are selectively associated with different ones of said switch means and alternately operatively effective to cause their associated switch means to become conductive, a system input port, and a system output port, each of said switch means having two output circuit terminals and a control terminal, the output circuit terminals of said first switch means being connected between said system input port and the control terminal of said second switch means, the output circuit terminals of said second switch means being connected between said reference voltage source and ground, said output circuit terminals of said third switch means being connected between the reference voltage side of said second switch means and said control terminal of said fourth switch means, said output circuit terminals of said fourth switch means being connected between said reference voltage source and ground, said system output port being connected to the reference voltage side of said fourth switch means, said first control voltage source being connected to the control terminal of said first switch means, and said second control voltage source being connected to the control terminal of said third switch means, whereby a data signal is transferred from said system input port to said system output port by the successive operative effects of said first and second control voltage sources.

2. In the shift register system of claim 1, means active between said system output port and said control terminal of said second switch means and effective to condition said second switch means to be conductive or non-conductive depending upon the nature of the data output at said system output port.

3. The shift register system of claim 2, in which said means active between said system output port and said control terminal of said second switch means comprises a fifth electronic switch means having output circuit terminals and a control terminal, said output circuit terminals of said fifth switch means being connected between said system output port and said control terminal of said second switch means, said second control voltage being connected to the control electrode of said fifth switch means.

4. The shift register system of claim 2, in which said means active between said system output port and said control terminal of said second switch means comprises a fifth electronic switch means having output circuit terminals and a control terminal, said output circuit terminals of said fifth switch means being connected between said system output port and said control terminal of said second switch means in series with a resistance, said second control voltage being connected to the control electrode of said fifth switch means.

5. In the shift register system of claim 1, means active between said system output port and said control terminal of said second switch means and effective to condition said second switch means to be conductive or non-conductive depending upon whether said fourth switch means is non-conductive or conductive respectively.

6. The shift register system of claim 5, in which said means active between said system output port and said control terminal of said second switch means comprises a fifth electronic switch means having output circuit terminals and a control terminal, said output circuit terminals of said fifth switch being connected between said system output port and said control terminal of said second switch means, said second control voltage being connected to the control electrode of said fifth switch means.

7. The shift register system of claim 5, in which said means active between said system output port and said control terminal of said second switch means comprises a fifth electronic switch means having output circuit terminals and a control terminal, said output circuit terminals of said fifth switch means being connected between said system output port and said control terminal of said second switch means in series with a resistance, said second control voltage being connected to the control electrode of said fifth switch means.

8. A shift register system comprising a system input port, first and second transfer stages each having an input and an output and each adapted to have a different output depending upon the input signal thereto, a system output port, a first electronic switch connected between said system input port and the input of said first stage, a second electronic switch connected between the output of said first stage and the input of said second stage, said system output port being connected to the output of said second stage, control means active on said first and second switches for causing them to become alternately conductive, and a feedback means operative between the output of said second stage and the input of said first stage during at least a portion of the time that said first switch is non-conductive, thereby to cause said first stage to assume a condition related to that of said second stage in a predetermined manner.

9. The shift register system of claim 8, in which said feedback means comprises a third electronic switch connected between the output of said second stage and the input of said first stage, said control means being active on said third switch to render it conductive during at least a portion of the time that said first switch is non-conductive.

10. The shift register system of claim 8, in which said feedback means comprises a third electronic switch connected between the output of said second stage and the input of said first stage in series with a resistance, said control means being active on said third switch to render it conductive during at least a portion of the time that said first switch is non-conductive.

11. A shift register system comprising first and second transfer stages each having an input and an output and each adapted to have a different output signal depending upon the input signal thereto, a system input port, first means for shifting a data signal at said input port to said input of said first transfer stage, second means for shifting a data signal at said output of said first transfer stage to said input of said second transfer stage, a system output port operatively connected to said output of said second transfer stage, cyclical control means operatively connected to said system for causing a given data signal at said system input port to be transferred from said system input port to said system output port via said first and second stages, said cyclical control means comprising means for providing first and second alternately operative control signals operatively connected to said first and second shifting means respectively and effective to cause their associated shifting means respectively to effect their respective signal shifts, said first control signal thereby being effective to transfer said data signal from said input port to said first stage and said second control signal being effective to transfer said data signal from said first stage to said second stage, and latching means operatively connected between the output of said second stage and the input of said first stage effective to retain said stages in a condition corresponding to the data signal at said system output port between cycles of said control means.

12. The system of claim 11, in which said second control signal is operatively connected to and is effective to actuate said latching means.

13. The system of claim 12, in which said second control signal is effective to actuate said latching means a predetermined period of time after said data signal has been transferred to said second stage.

References Cited

UNITED STATES PATENTS

| | | | |
|---|---|---|---|
| 3,082,332 | 3/1963 | Smeltzer | 307—221 |
| 3,185,864 | 5/1965 | Amodei et al. | 307—221 |
| 3,230,393 | 1/1966 | Amodei | 307—221 |
| 3,252,009 | 5/1966 | Weimer | 328—37 X |

JOHN S. HEYMAN, *Primary Examiner.*